(12) United States Patent
Doi et al.

(10) Patent No.: US 10,857,835 B2
(45) Date of Patent: Dec. 8, 2020

(54) PNEUMATIC TIRE AND METHOD FOR MANUFACTURING THE SAME

(71) Applicant: The Yokohama Rubber Co., LTD., Tokyo (JP)

(72) Inventors: Hidefumi Doi, Hiratsuka (JP); Masahiro Hirano, Hiratsuka (JP)

(73) Assignee: The Yokohama Rubber Co., LTD.

( * ) Notice: Subject to any disclaimer, the term of this patent is extended or adjusted under 35 U.S.C. 154(b) by 247 days.

(21) Appl. No.: 15/105,546

(22) PCT Filed: Dec. 15, 2014

(86) PCT No.: PCT/JP2014/083153
§ 371 (c)(1),
(2) Date: Jun. 16, 2016

(87) PCT Pub. No.: WO2015/093440
PCT Pub. Date: Jun. 25, 2015

(65) Prior Publication Data
US 2016/0318344 A1  Nov. 3, 2016

(30) Foreign Application Priority Data
Dec. 16, 2013  (JP) .................................. 2013-259102

(51) Int. Cl.
*B60C 9/22* (2006.01)
*B29D 30/30* (2006.01)
(Continued)

(52) U.S. Cl.
CPC ........ *B60C 9/2204* (2013.01); *B29D 30/3028* (2013.01); *B29D 30/70* (2013.01); *B29D 30/72* (2013.01); *B60C 2009/2219* (2013.01)

(58) Field of Classification Search
CPC .... B29D 30/3028; B29D 30/70; B29D 30/72; B60C 9/22; B60C 9/2204;
(Continued)

(56) References Cited

U.S. PATENT DOCUMENTS 4,184,530 A * 1/1980 Mirtain ................. B60C 9/2009
152/527
4,202,394 A * 5/1980 van der Burg ......... B29D 30/54
152/531

(Continued)

FOREIGN PATENT DOCUMENTS

JP          01132405 A  *  5/1989
JP          02128904 A  *  5/1990
(Continued)

OTHER PUBLICATIONS

Robert C. Miller, Tire, Nov. 2012, How Products Are made, vol. 1, p. 4. (Year: 2012).*
(Continued)

Primary Examiner — Robert C Dye
Assistant Examiner — Sedef E Paquette
(74) Attorney, Agent, or Firm — Thorpe North & Western

(57) ABSTRACT

A pneumatic tire and a method for manufacturing the same are provided. In a step of laminating belt reinforcing layers on an outer circumferential side of a belt layer constituting a green tire, wherein the belt reinforcing layers cover each of a tire width direction left edge portion and right edge portion of the belt layer and are separated from each other in the tire width direction, each of the belt reinforcing layers is formed by inclining strip members constituting each of the reinforcing layers in a same direction with respect to a tire circumferential direction, and winding the strip members in a spiral-like manner at least one time around in the tire circumferential direction.

9 Claims, 9 Drawing Sheets

(51) Int. Cl.
  *B29D 30/70* (2006.01)
  *B29D 30/72* (2006.01)

(58) Field of Classification Search
  CPC .... B60C 2009/2219; B60C 2009/1864; B60C 2009/2035; B60C 2009/2038; B60C 2009/1857; B60C 2009/2041; B60C 9/18; B60C 9/1835; B60C 2009/1842
  USPC ........................................ 152/530; 156/110.1
  See application file for complete search history.

(56) References Cited

U.S. PATENT DOCUMENTS

| | | | | |
|---|---|---|---|---|
| 5,178,704 A | * | 1/1993 | Hanada | B29D 30/3007 152/531 |
| 5,373,885 A | * | 12/1994 | Yamashita | B60C 9/18 152/527 |
| 5,396,941 A | * | 3/1995 | Iuchi | B60C 9/2204 152/527 |
| 5,931,211 A | * | 8/1999 | Tamura | B60C 1/0016 152/209.5 |
| 2002/0026979 A1 | * | 3/2002 | Tanaka | B29D 30/3028 156/130.7 |
| 2010/0132867 A1 | * | 6/2010 | Kikuchi | C08L 15/00 152/547 |
| 2012/0006461 A1 | * | 1/2012 | Oomiya | B29D 30/3028 152/526 |
| 2013/0118668 A1 | * | 5/2013 | Ascanelli | B60C 9/0007 152/527 |
| 2015/0336345 A1 | * | 11/2015 | Maehara | B60C 9/2204 156/117 |
| 2016/0059637 A1 | * | 3/2016 | Shimomura | B60C 9/28 152/209.16 |

FOREIGN PATENT DOCUMENTS

| | | | |
|---|---|---|---|
| JP | 04166402 A | * | 6/1992 |
| JP | 06032110 A | * | 2/1994 |
| JP | 2003220806 A | * | 8/2003 |
| JP | 2004-189156 | | 7/2004 |
| JP | 2005-041328 | | 2/2005 |
| JP | 2007145123 A | * | 6/2007 |
| JP | 2009-056938 | | 3/2009 |

OTHER PUBLICATIONS

Morita, JP 2005-041328, machine translation. (Year: 2005).*
Sato, JP 2004-189156, machine translation. (Year: 2004).*
Tadashi Watanabe, JP 01132405, machine translation. (Year: 1989).*
Kenichi Morita, JP 2003220806, machine translation. (Year: 2003).*
Eiji Nakasaki, JP-04166402, machine translation. (Year: 1992).*
Tadashi Watanabe, JP-01132405, updated machine translation. (Year: 1989).*
Norifumi Suehiro, JP-06032110-A, machine translation. (Year: 1994).*
Takayuki Sato, JP-2007145123-A, machine translation. (Year: 2007).*
Takuya Okazaki, JP-02128904-A, machine translation. (Year: 1990).*
International Search Report for International Application No. PCT/JP2014/083153 dated Mar. 17, 2015, 2 pages, Japan.

* cited by examiner

PNEUMATIC TIRE AND METHOD FOR MANUFACTURING THE SAME

TECHNICAL FIELD

The present technology relates to a pneumatic tire and a method for manufacturing the same, and particularly relates to a pneumatic tire whereby road noise reduction performance and high-speed durability performance can be ensured at high levels without causing any degradation in uniformity, and a method for manufacturing the same.

BACKGROUND ART

Structures of pneumatic tires are known where a belt layer is disposed on an outer circumferential side of a carcass layer, and reinforcing layers are disposed so as to cover both tire width direction edge portions of the belt layer (e.g., see Japanese Unexamined Patent Application Publication No. 2009-56938). According to this tire structure, when traveling, movement in the tire radial direction of both of the tire width direction edge portions of the belt layer is suppressed by the belt reinforcing layers. Therefore, road noise can be reduced. Furthermore, high-speed durability of the tire can be enhanced. By disposing the belt reinforcing layers so as to protrude outward in the tire width direction, even further enhancements in road noise reduction and high-speed durability of the tire can be expected.

As illustrated in FIG. 8, the belt reinforcing layers 6 have a wound structure constituted by strip members 7 including one or a plurality of fiber cords being wound in a spiral-like manner in the tire circumferential direction so as to be substantially parallel. When the belt reinforcing layers 6 are disposed so as to be separated in the tire width direction and cover both of the tire width direction edge portions of the belt layer 5, as illustrated in FIG. 9, the strip members 7 are wound and laminated on the outer circumferential side of the belt layer 5 on a molding drum 10. Note that while the belt layer 5 is laminated on the outer circumferential side of a carcass layer on the molding drum 10, the carcass layer is omitted from and not illustrated in FIG. 9.

In the step of laminating the belt reinforcing layers 6, each of the strip members 7 is held by a winding head 11 and is fed out on an outer circumferential surface of the belt layer 5; and, at the same time, each of the winding heads 11 is moved along a guide 12 while rotating the molding drum 10 in a first direction of the circumferential direction. At this time, the winding head 11 on the left side is moved from a center portion side in a drum width direction to a left side in the drum width direction, and the winding head 11 on the right side is moved from the center portion side in the drum width direction to a right side in the drum width direction. That is, the strip members 7 constituting the belt reinforcing layers 6 are each inclined in mutually different directions with respect to the tire circumferential direction, and are wound in a spiral-like manner in the drum circumferential direction, such that a winding start point, namely a longitudinal direction edge 7a, is set farther to the center portion side in the tire width direction than a winding termination point, namely a longitudinal direction edge 7b. As a result, tire width direction gaps S1 and S2 between the belt reinforcing layers 6, disposed so as to be separated in the tire width direction, vary along the tire circumferential direction as illustrated in FIG. 8 (i.e. S1≠S2). Due to this, a problem occurs in that the uniformity of the tire degrades.

SUMMARY

The present technology provides a pneumatic tire whereby road noise reduction performance and high-speed durability performance can be ensured at high levels without causing any degradation in uniformity, and a method for manufacturing the same.

A pneumatic tire of the present technology includes a belt layer embedded in an outer circumferential side of a carcass layer, and belt reinforcing layers embedded in an outer circumferential side of the belt layer so as to cover each of a tire width direction left edge portion and right edge portion and be separated from each other in the tire width direction. In such a pneumatic tire, each of the belt reinforcing layers is formed from strip members constituting each of the reinforcing layers that are both inclined in a same direction with respect to a tire circumferential direction, and are wound in a spiral-like manner at least one time around in the tire circumferential direction.

A method for manufacturing the pneumatic tire of the present technology includes molding a green tire having a structure constituted by belt reinforcing layers being laminated on an outer circumferential side of an annularly-formed belt layer, constituting the green tire, so that the belt reinforcing layers cover each of a tire width direction left edge portion and right edge portion and are separated from each other in the tire width direction. Thereafter, in the method for manufacturing a pneumatic tire in which the green tire is vulcanized, in a step of laminating each of the belt reinforcing layers, strip members constituting each of the reinforcing layers are inclined in a same direction with respect to a tire circumferential direction, and the strip members are wound in a spiral-like manner at least one time around in the tire circumferential direction.

According to the pneumatic tire of the present technology, the belt reinforcing layers, which are embedded on the outer circumferential side of the belt layer so as to cover each of the tire width direction left edge portion and right edge portion of the belt layer, are formed by winding the strip members in a spiral-like manner at least one time around in the tire circumferential direction. Therefore, annular belt reinforcing layers where the strip members are robust are formed. As such, during traveling, movement in the tire radial direction of both of the tire width direction edge portions of the belt layer is sufficiently suppressed by the belt reinforcing layers and, therefore, road noise can be reduced at a high level. Furthermore, high-speed durability of the tire can be enhanced at a high level. Additionally, due to the fact that both of the strip members constituting each of the belt reinforcing layers are inclined in the same direction with respect to the tire circumferential direction and are wound in a spiral-like manner in the tire circumferential direction, the tire width direction gaps between the mutually separated belt reinforcing layers is roughly constant along the tire circumferential direction. As such, the defect of tire uniformity degrading caused by the belt reinforcing layers can be avoided.

According to the method for manufacturing the pneumatic tire of the present technology, in the step of laminating the belt reinforcing layers on the outer circumferential side of the annularly-formed belt layer, constituting the green tire, so that the belt reinforcing layers cover each of the tire width direction left edge portion and right edge portion of the belt layer and are separated from each other in the tire width direction, each of the belt reinforcing layers is formed by inclining the strip members constituting each of the reinforcing layers in the same direction with respect to the tire circumferential direction, and winding the strip members in a spiral-like manner at least one time around in the tire circumferential direction. Therefore, annular belt reinforcing layers where the strip members are robust are formed in the manufactured tire. As such, during traveling, movement in the tire radial direction of both of the tire width direction edge portions of the belt layer is sufficiently suppressed by the belt reinforcing layers and, therefore, road noise can be reduced at a high level. Furthermore, high-speed durability of the tire can be enhanced at a high level. Additionally, due to the fact that both of the strip members constituting each of the belt reinforcing layers are inclined in the same direction with respect to the tire circumferential direction and are wound in a spiral-like manner in the tire circumferential direction, the tire width direction gaps between the mutually separated belt reinforcing layers is roughly constant along the tire circumferential direction. As such, the defect of tire uniformity degrading caused by the belt reinforcing layers can be avoided.

DETAILED DESCRIPTION

Figure 1:
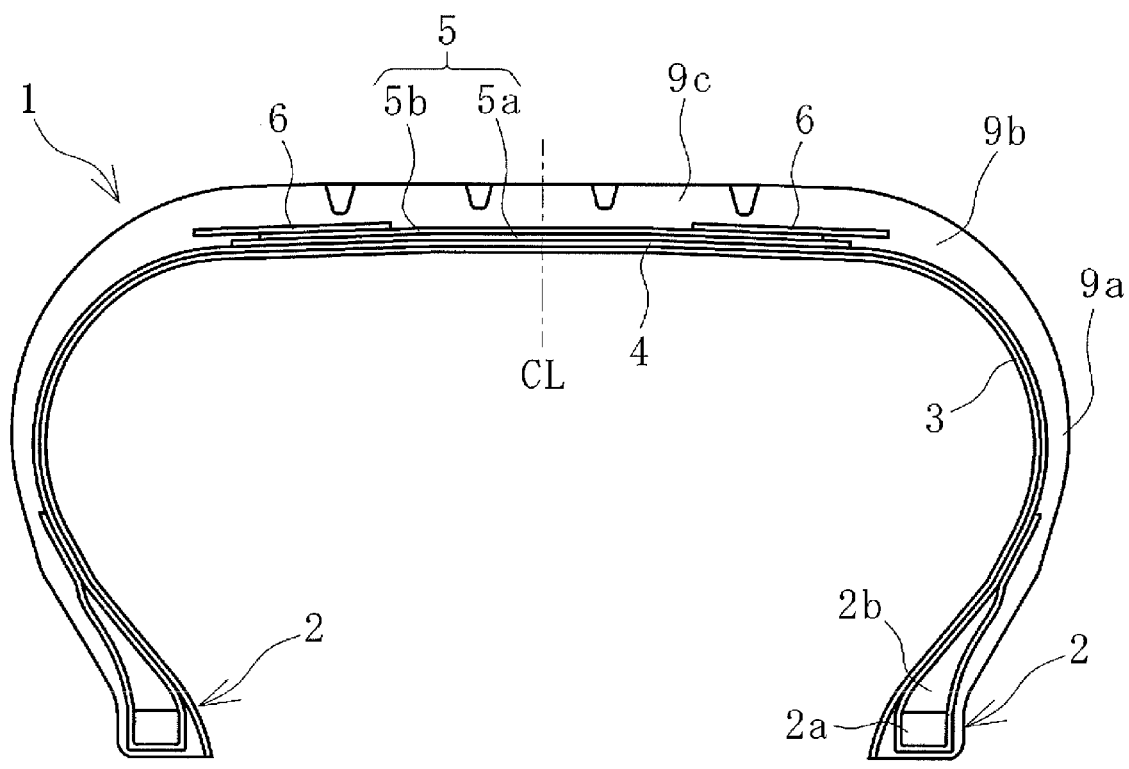
FIG. 1 is a cross-sectional view taken along a meridian of a tire illustrating an internal structure of the pneumatic tire of the present technology.

A pneumatic tire and a method for manufacturing the same of the present technology are described on the basis of embodiments that are illustrated in the drawings.

Figure 2:
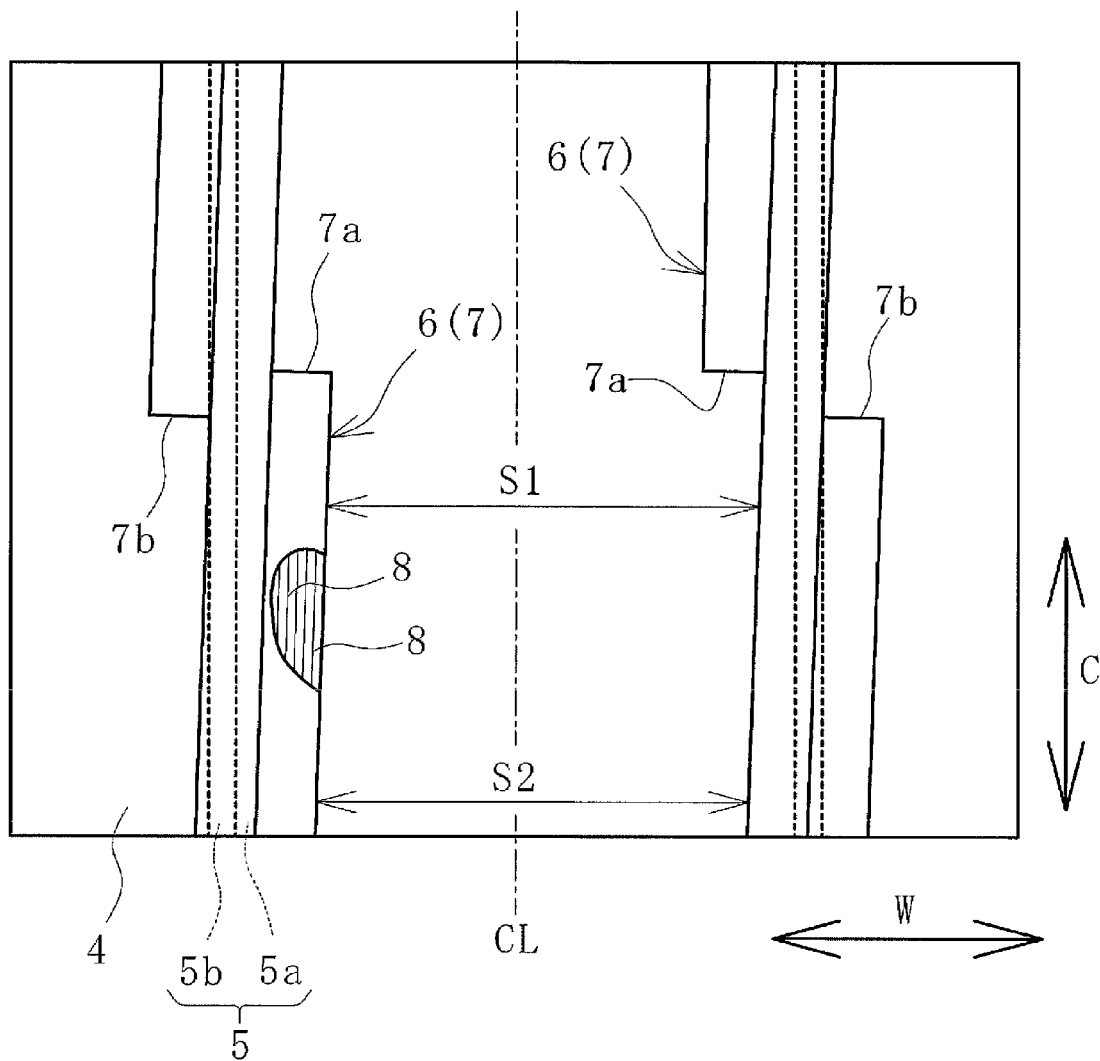
FIG. 2 is a plan view illustrating belt reinforcing layers of FIG. 1.

A pneumatic tire 1 of the present technology illustrated in FIGS. 1 and 2 is a radial tire. A carcass layer 4 extends between a left-right pair of bead portions 2. In the carcass layer 4, reinforcing cords extending in a tire radial direction are disposed at a predetermined pitch in the tire circumferential direction and are embedded in a rubber layer. In the drawings, the C arrow direction represents the tire circumferential direction, the W arrow direction represents the tire width direction, and the dot-dash line CL represents a tire width directional center line. Both tire width direction edges of the carcass layer 4 are folded back from the inside to the outside in the tire width direction around annular bead cores 2a constituting the bead portions 2 so as to sandwich the bead fillers 2b. The carcass layer 4 is disposed on an outer circumferential side of an innermost layer, namely an inner liner 3. The inner liner 3 extends to the left and right bead portions 2.

Tread rubber wherein a predetermined pattern is formed is disposed in the tread portion 9c, and an outer side of the carcass layer 4 of a shoulder portion 9b and an outer side of the carcass layer 4 of a side portion 9a are covered with rubber. Two layers of belt layers 5 (5a and 5b) are embedded on an outer circumferential side of the carcass layer 4 in the tread portion 9c. These belt layers 5a and 5b are disposed so that the reinforcing cords are inclined with respect to the tire circumferential direction and the reinforcing cords of each layer cross each other. A tire width direction dimension (belt width) of the innermost belt layer 5a is greater than that of the outermost belt layer 5b.

Belt reinforcing layers 6, which are mutually separated in the tire width direction and cover each of the tire width direction left edge portion and right edge portion of the belt layers 5, are embedded in an outer circumferential side of the outermost belt layer 5b. Specifications of each of the belt reinforcing layers 6 are substantially the same. In this embodiment, each of the belt reinforcing layers 6 is embedded so as to protrude outward in the tire width direction from an edge in the tire width direction of the belt layers 5 on a side where each of the belt reinforcing layers 6 is disposed. That is, the belt reinforcing layer 6 on the left side protrudes farther to the left side in the tire width direction than the tire width direction left edge portion of the belt layer 5 (the widest belt layer 5a), and the belt reinforcing layer 6 on the right side protrudes farther to the right side in the tire width direction than the tire width direction right edge portion of the belt layer 5 (the widest belt layer 5a).

Each of the belt reinforcing layers 6 is formed by winding a strip member 7 in a spiral-like manner at least one time around in the tire circumferential direction. The strip members 7 are formed by embedding a plurality of extended reinforcing cords 8 in a rubber layer, and an extending direction of the reinforcing cords 8 becomes a longitudinal direction of the strip members 7. In FIG. 2, a portion of the strip member 7 is cut away to illustrate the reinforcing cords 8 embedded therein. The strip members 7 constituting each of the belt reinforcing layers 6 are both inclined in the same direction with respect to the tire circumferential direction (that is, with respect to the tire width directional center line CL), and are wound in a spiral-like manner in the tire circumferential direction. The strip members 7 are wound in a spiral-like manner so that adjacent width direction edges thereof contact in a manner substantially free of gaps.

A width of the strip members 7 is, for example, from 5 mm to 20 mm. Examples of cords that can be used as the reinforcing cords 8 include nylon fiber cords, polyester fiber cords, polyketone fiber cords, lyocell fiber cords, polyamide fiber cords, and the like.

In the pneumatic tire 1, each of the belt reinforcing layers 6 is formed by winding the strip member 7 in a spiral-like manner at least one time around in the tire circumferential direction. As a result, annular belt reinforcing layers 6 where the strip members 7 are robust are formed and, during traveling, movement in the tire radial direction of both of the tire width direction edge portions of the belt layers 5 is sufficiently suppressed by the robust belt reinforcing layers 6. As such, road noise can be reduced at a high level and also high-speed durability of the tire can be enhanced at a high level. In this embodiment, each of the belt reinforcing layers 6 is embedded so as to protrude outward in the tire width direction from the edge in the tire width direction of the belt layer 5a. Therefore, the effects of reducing road noise and the high-speed durability performance of the tire can be enhanced further.

Additionally, both of the strip members 7 are inclined in the same direction with respect to the tire circumferential direction and are wound in a spiral-like manner in the tire circumferential direction. Therefore, the tire width direction gaps S1 and S2 between the mutually separated belt reinforcing layers 6 are roughly constant along the tire circumferential direction (S1≈S2). As a result, the uniformity of the pneumatic tire 1 will increase and, thus, tire uniformity degrading caused by the belt reinforcing layers 6 can be avoided.

In this embodiment, a longitudinal direction edge 7a, of each of the strip members 7 constituting each of the belt reinforcing layers 6, positioned on a center portion side of the tire width direction, is mutually set at substantially a same position along the tire circumferential direction; and a longitudinal direction edge 7b of each of the strip members, positioned farther to an outer side of the tire width direction than the longitudinal direction edge 7a, is mutually set at substantially a same position along the tire circumferential direction. As a result of this configuration, the uniformity of the pneumatic tire 1 will increase further. It is more beneficial if the positions in the tire circumferential direction of each of the longitudinal direction edges 7a and 7b of the strip members 7 are configured to be substantially a same position.

Next, a method for manufacturing the pneumatic tire 1 is described.

Figure 3:
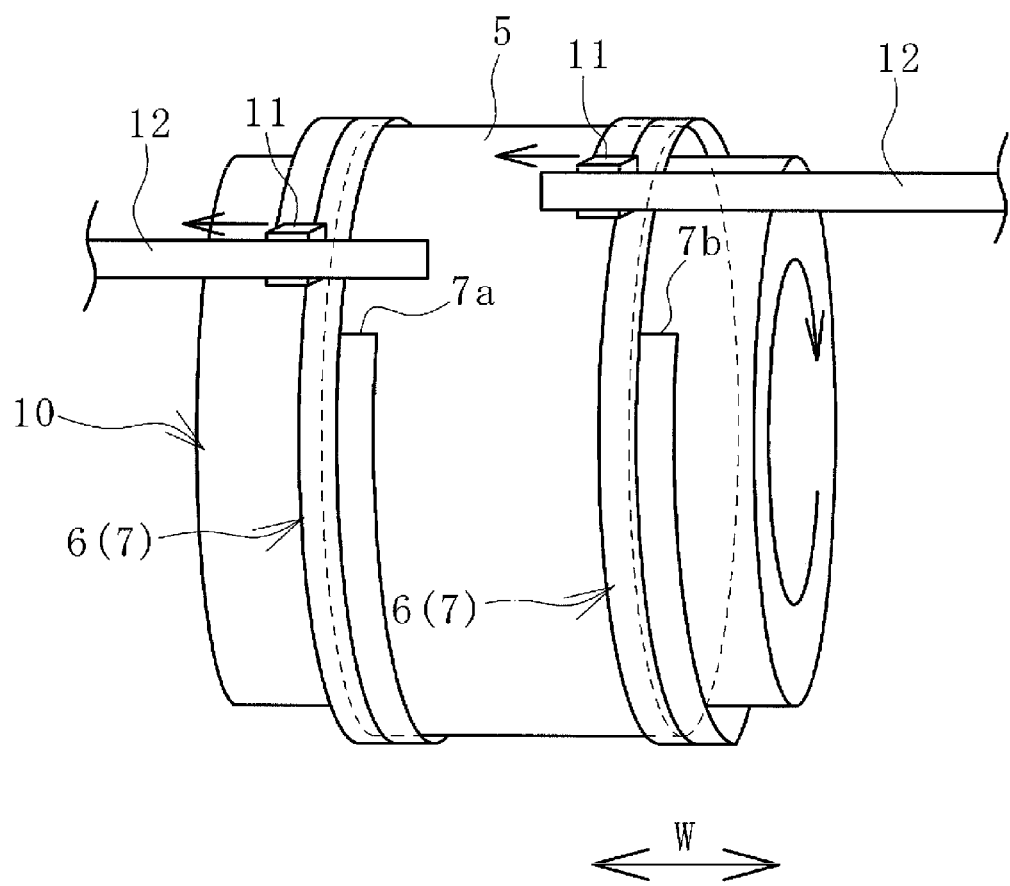
FIG. 3 is an explanatory drawing illustrating a step of laminating the belt reinforcing members of FIG. 2 on an outer circumferential side of the belt layer.

A laminated body constituted by the annularly-formed inner liner 3, the carcass layer 4, and the like is wound on a molding drum 10 illustrated in FIG. 3. In FIG. 3, for convenience in viewing, these components are omitted and are not depicted. The green tire G is molded in a state where the annular belt layers 5 (5a and 5b), the belt reinforcing layers 6, the tread rubber, and the like are laminated on the outer circumferential side of this laminated body. Alternatively, a second laminated body can be molded by forming the belt layers 5 (5a and 5b) into an annular shape by winding the belt layers 5 (5a and 5b) on the outer circumferential surface of the molding drum 10, then laminating the belt reinforcing layers 6 on the outer circumferential side of the belt layers 5, and then laminating the other tire constituents such as the tread rubber constituting the tread portion 9c on the outer circumferential side of each of the belt reinforcing layers 6. In this case, the first laminated body constituted by the annularly-formed inner liner 3, the carcass layer 4, and the like is molded separately from the second laminated body, and the green tire G is molded by laminating the second laminated body on the outer circumferential side of the first laminated body. That is, in the method for manufacturing a pneumatic tire of the present technology, the green tire G can be molded using various procedures, but any method used has the characteristics described hereinafter when laminating the belt reinforcing layers 6.

In the step of laminating each of the belt reinforcing layers 6, the strip members 7 constituting each of the reinforcing layers 6 are inclined in the same direction with respect to the tire circumferential direction, and wound in a spiral-like manner at least one time around in the drum circumferential direction. Here, as illustrated in FIG. 3, a winding start point, namely the longitudinal direction edge 7a, of a first of the strip members 7 constituting the belt reinforcing layer 6 covering the tire width direction left edge portion of the belt layers 5, is set on the center portion side of the tire width direction, and a winding termination point, namely the longitudinal direction edge 7b, is set farther to the outer side in the tire width direction than the winding start point; and the first of the strip members 7 is wound in a spiral-like manner at least one time around in the tire circumferential direction, while rotating the annular belt layers 5, constituting the green tire G being molded, in a first direction of the circumferential direction. Specifically, the strip member 7 is held by a winding head 11 and is fed out on the outer circumferential surface of the belt layers 5; and, at the same time, the winding head 11 is moved along a guide 12 from the center portion side of the tire width direction to the left side in the tire width direction, while rotating the molding drum 10 in the first direction in the circumferential direction. Thus the strip member 7 is wound in a spiral-like manner.

Additionally, a winding start point, namely a longitudinal direction edge 7b, of a second of the strip members 7 constituting the belt reinforcing layer 6 covering the tire width direction right edge portion of the belt layers 5, is set on the outer side of the tire width direction, and a winding termination point, namely a longitudinal direction edge 7a, is set farther to the center portion side in the tire width direction than the winding start point; and the second of the strip members 7 is wound in a spiral-like manner at least one time around in the tire circumferential direction, while rotating the annular belt layers 5, constituting the green tire G being molded, in the same direction as the first direction of the circumferential direction used when winding the left side strip member 7. Specifically, the strip member 7 is held by a winding head 11 and is fed out on the outer circumferential surface of the belt layers 5; and, at the same time, the winding head 11 is moved along a guide 12 from the right side of the tire width direction to the center portion side in the tire width direction, while rotating the molding drum 10 in the first direction in the circumferential direction. Thus, the strip member 7 is wound in a spiral-like manner. As a result of this laminating step, there is a benefit in that the winding work of the left and right strip members 7 can be performed simultaneously.

In this embodiment, each of the belt reinforcing layers 6 is laminated so as to protrude outward in the tire width direction from an edge in the tire width direction of the widest belt layer 5a on the side where each of the belt reinforcing layers 6 is laminated. Additionally, the longitudinal direction edges 7a of the strip members 7 constituting each of the belt reinforcing layers 6, positioned on the center portion side of the tire width direction are mutually set at the same position along the tire circumferential direction; and the longitudinal direction edges 7b of the strip members 7, positioned on the outer side of the tire width direction are mutually set at the same position along the drum circumferential direction.

Figure 4:
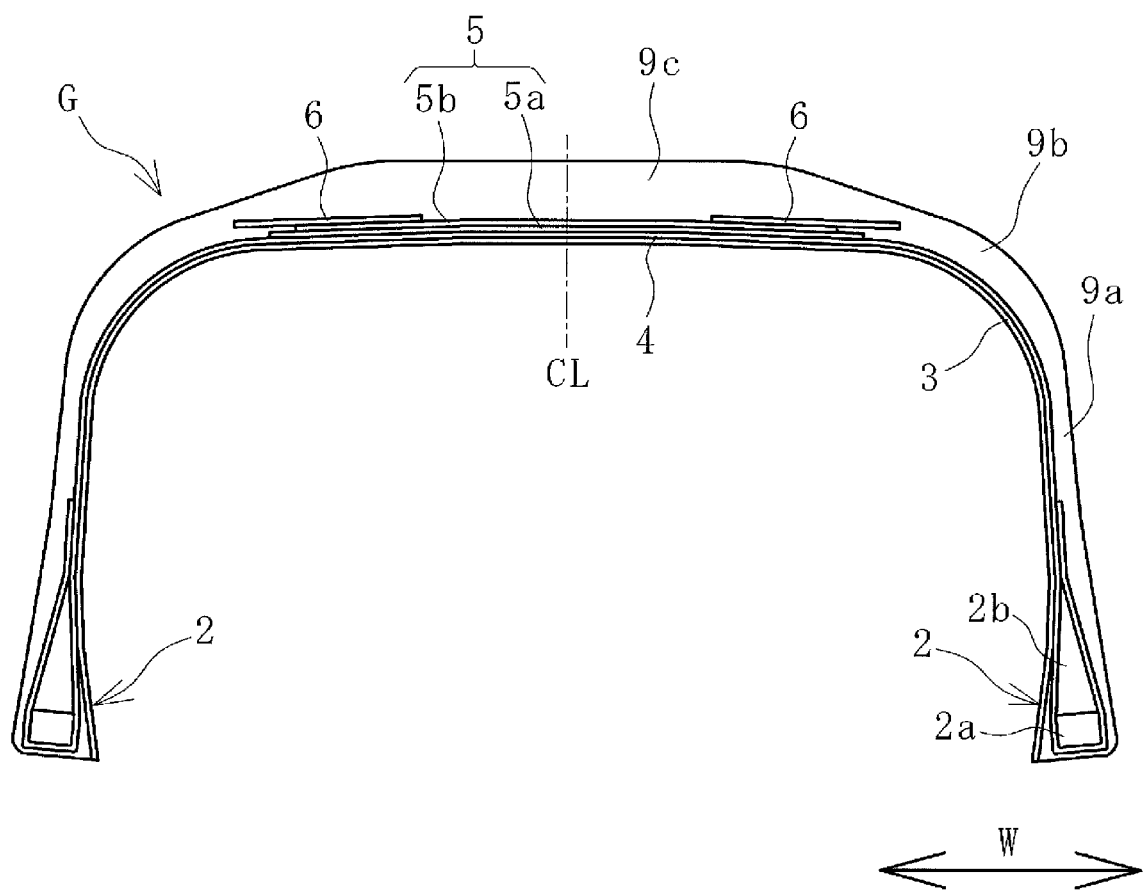
FIG. 4 is a cross-sectional view illustrating a molded green tire.

After laminating the belt reinforcing layers 6 as described above, the other tire constituents such as the tread rubber constituting the tread portion 9c are laminated on the outer circumferential side of each of the belt reinforcing layers 6, and the green tire G such as that illustrated in FIG. 4 is molded. Next, the pneumatic tire 1 illustrated in FIG. 1 is manufactured by vulcanizing the green tire G.

Figure 5:
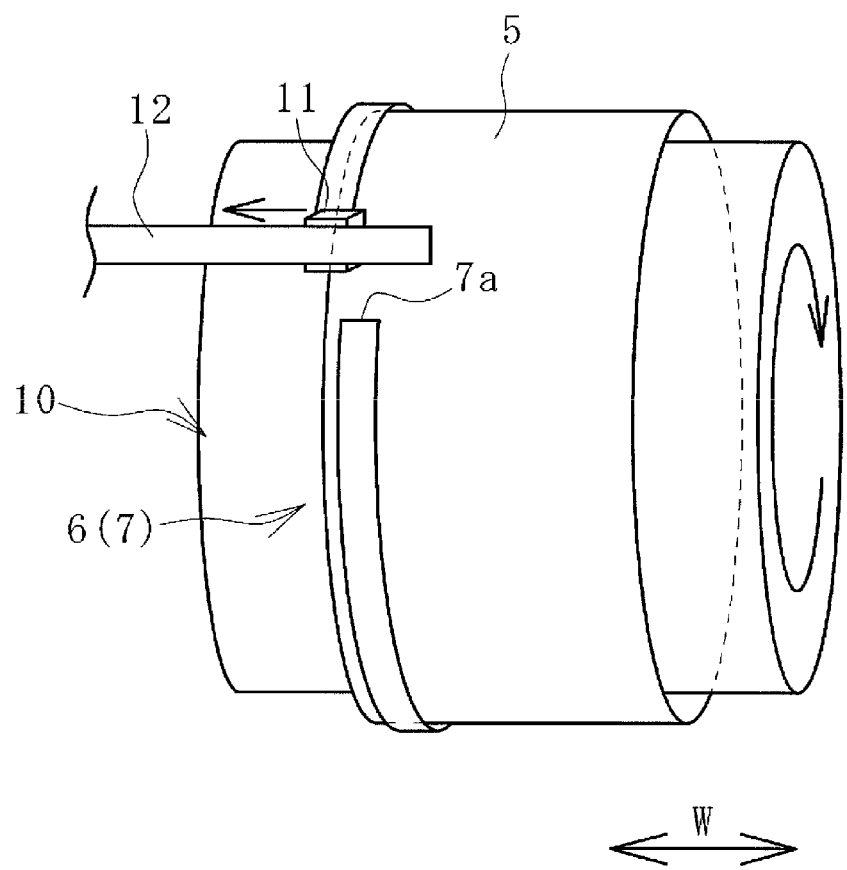
FIG. 5 is an explanatory drawing schematically illustrating a step of laminating the belt reinforcing member, on a left side in the tire width direction of FIG. 2, on an outer circumferential side of the belt layer.
Figure 6:
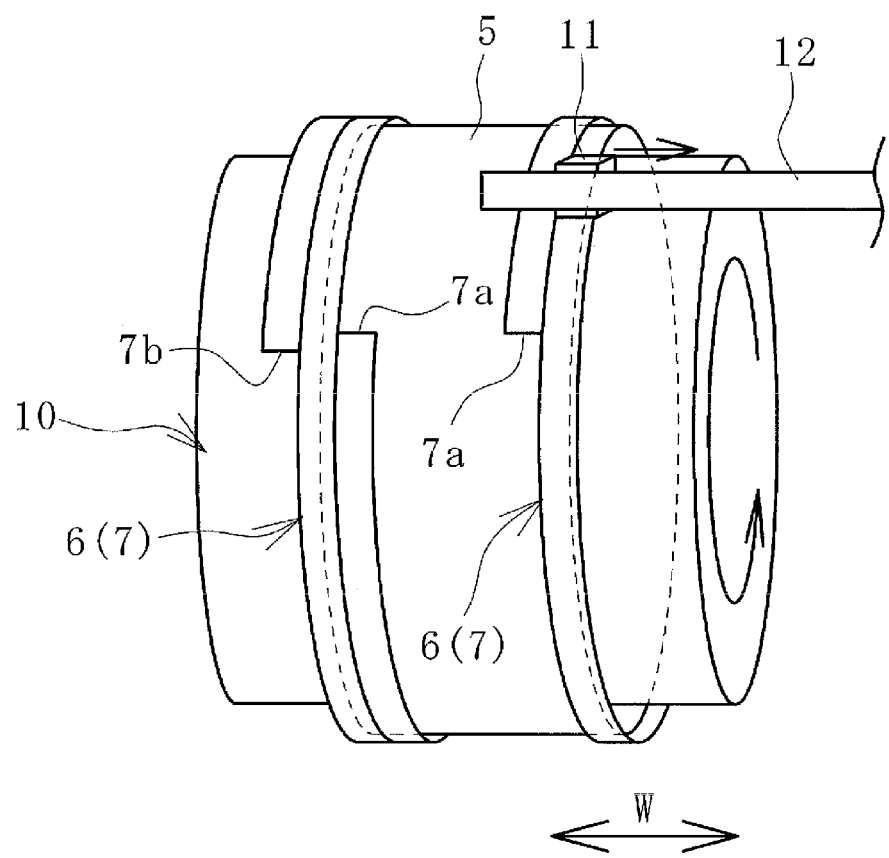
FIG. 6 is an explanatory drawing schematically illustrating a step of laminating the belt reinforcing member, on a right side in the tire width direction of FIG. 2, on the outer circumferential side of the belt layer.

Each of the belt reinforcing layers 6 can be laminated via another method illustrated in FIGS. 5 and 6. The belt layers 5 are wound annularly on the outer circumferential surface of the molding drum 10 illustrated in FIGS. 5 and 6.

In this method, as illustrated in FIG. 5, the winding start point, namely the longitudinal direction edge 7a, of the first of the strip members 7 constituting the belt reinforcing layer 6 covering the tire width direction left edge portion of the belt layers 5, is set farther to the center portion side of the tire width direction than the left edge of the belt layers 5, and the winding termination point, namely the longitudinal direction edge 7b, is set farther to the outer side in the tire width direction than the winding start point; and the first of the strip members 7 is wound in a spiral-like manner at least one time around in the tire circumferential direction, while rotating the annular belt layers 5, constituting the green tire G being molded, in the first direction of the circumferential direction. Specifically, the strip member 7 is held by a winding head 11 and is fed out on the outer circumferential surface of the belt layers 5; and, at the same time, the winding head 11 is moved along a guide 12 from the center portion side of the tire width direction to the left side in the tire width direction, while rotating the molding drum 10 in the first direction in the circumferential direction. Thus the strip member 7 is wound in a spiral-like manner.

Additionally, as illustrated in FIG. 6, the winding start point, namely the longitudinal direction edge 7a, of the second of the strip members 7 constituting the belt reinforcing layer 6 covering the tire width direction right edge portion of the belt layers 5, is set farther to the center portion side of the tire width direction than the right side of the belt layers 5, and the winding termination point, namely a longitudinal direction edge 7b, is set farther to the outer side in the tire width direction than the winding start point; and the second of the strip members 7 is wound in a spiral-like manner at least one time around in the tire circumferential direction, while rotating the annular belt layers 5, constituting the green tire G being molded, in a direction opposite the first direction of the circumferential direction. Specifically, the strip member 7 is held by the winding head 11 and is fed out on the outer circumferential surface of the belt layers 5; and, at the same time, the winding head 11 is moved along the guide 12 from the center portion side of the tire width direction to the right side in the tire width direction, while rotating the molding drum 10 in the direction opposite the first direction in the circumferential direction used when winding the left side strip member 7. Thus, the strip material 7 is wound in a spiral-like manner.

In this embodiment, each of the belt reinforcing layers 6 is laminated so as to protrude outward in the tire width direction from an edge in the tire width direction of the widest belt layer 5a on the side where each of the belt reinforcing layers 6 is laminated. Additionally, the longitudinal direction edges 7a of the strip members 7 constituting each of the belt reinforcing layers 6, positioned on the center portion side of the tire width direction are mutually set at the same position along the tire circumferential direction; and the longitudinal direction edges 7b of the strip members 7, positioned on the outer side of the tire width direction are mutually set at the same position along the tire circumferential direction.

In this method, the winding start point, namely, the longitudinal direction edge 7a, of each of the strip members 7 becomes the outer peripheral surface of the belt layers 5. Therefore, the winding start point can be fixed strongly to the belt layers 5. As such, the strip members 7 can be securely wound in a spiral-like manner. In cases where the belt reinforcing layers 6 are laminated farther outward in the tire width direction than the edge in the tire width direction of the widest belt layer 5a, it will be difficult to securely wind the strip members 7 if the positions of the winding start points of the strip members 7 are offset from the belt layer 5a. However, with the method illustrated in FIGS. 5 and 6, the strip members 7 can be wound in an extremely secure manner. Such a configuration is even more beneficial for ensuring road noise reduction performance and high-speed durability performance at high levels without causing any degradation in the uniformity of the pneumatic tire 1.

In the embodiments described above, a number of the belt reinforcing layers 6 embedded in the outer circumferential side of the belt layers 5 was one, but a plurality of the belt reinforcing layers 6 may be vertically stacked and embedded as well. From the perspective of reducing the weight of the tire, the number of belt reinforcing layers 6 embedded in each of the tire width direction left edge portion and right edge portion of the belt layers 5 is preferably one.

Figure 7:
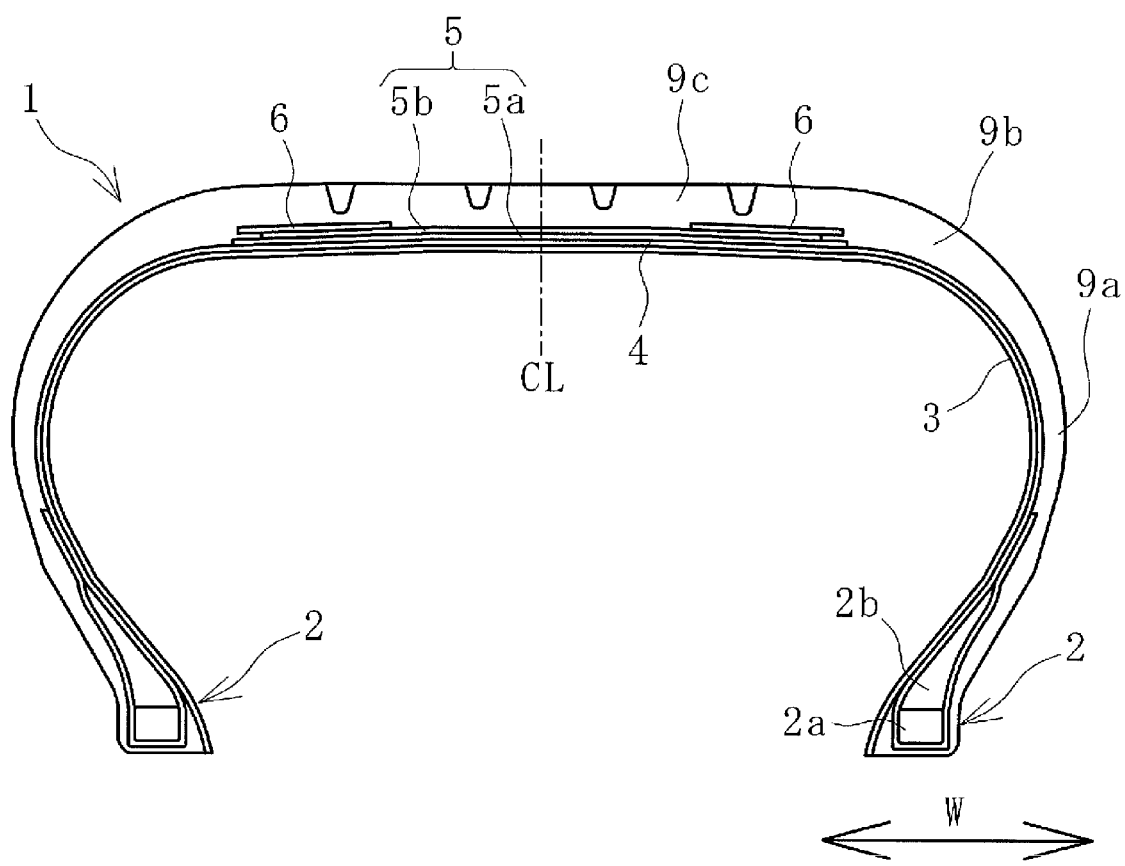
FIG. 7 is a cross-sectional view taken along a meridian of a tire illustrating an internal structure of another embodiment of the pneumatic tire of the present technology.

As illustrated in FIG. 7, with the pneumatic tire 1 of the present technology, a configuration is also possible in which each of the belt reinforcing layers 6 does not protrude outward in the tire width direction from the tire width direction edge of the side of the widest belt layer 5a where each of the belt reinforcing layers 6 is embedded.

EXAMPLES

Using two types of test tires (Working Example and Conventional Example), that is, pneumatic tires for a passenger vehicle having identical specifications where only an embedding specification of the belt reinforcing layers differed, Radial Force Variation (RFV) and Radial Run Out (RRO) were measured and the results thereof are shown in Table 1. In Table 1, measurement values of the Examples are indexed, a measurement value of the Conventional Example being a reference at 100. Smaller index numbers indicate superior uniformity of the tire.

Figure 8:
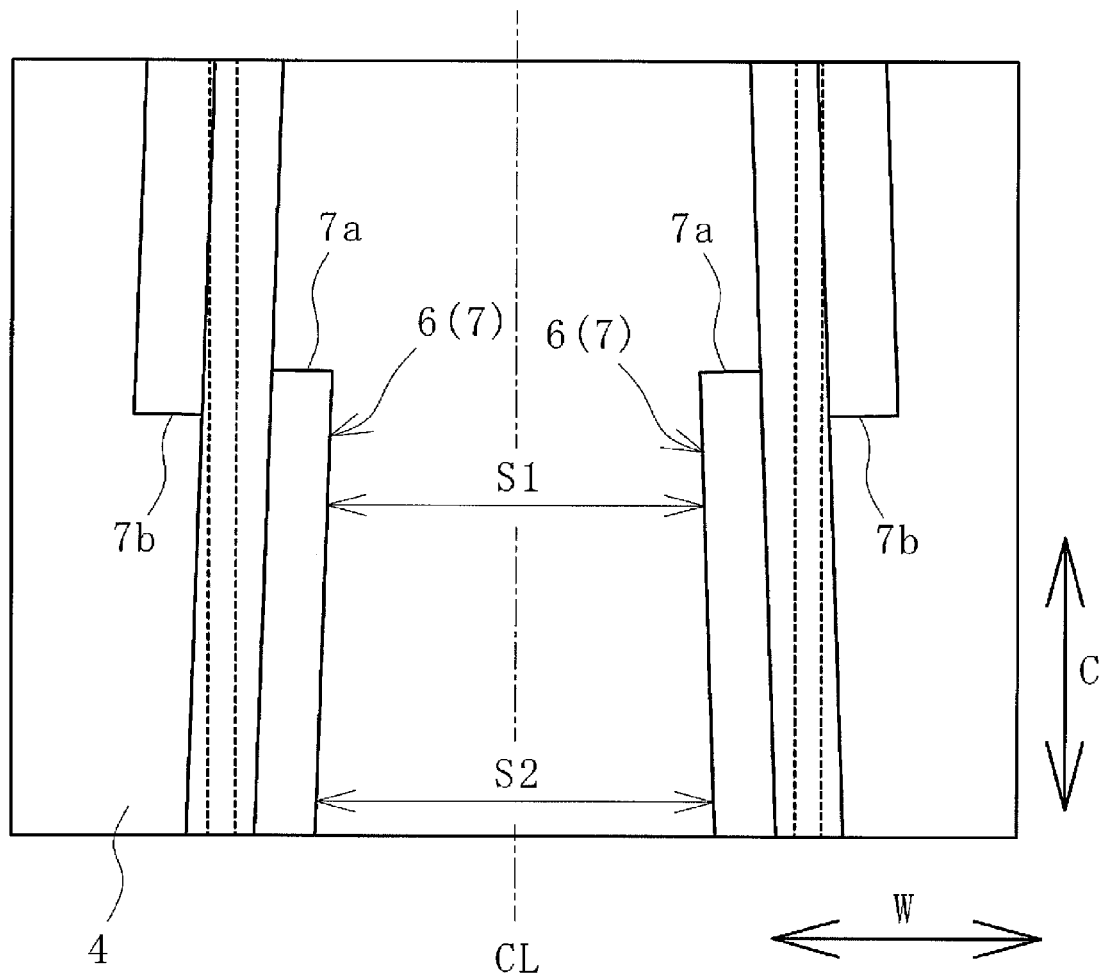
FIG. 8 is a plan view illustrating conventional belt reinforcing layers.
Figure 9:
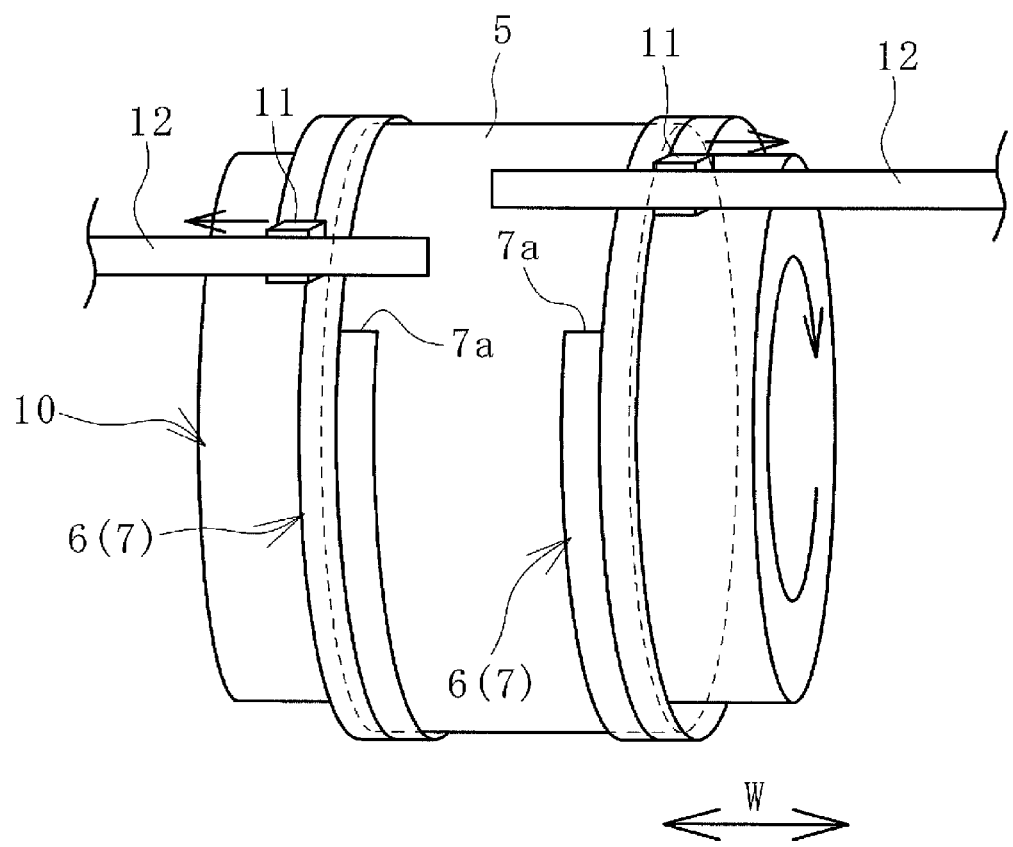
FIG. 9 is an explanatory drawing illustrating a step of laminating the belt reinforcing layers of FIG. 8 on an outer circumferential side of the belt layer.

As illustrated in FIG. 2, the tire width direction gaps S1 and S2 between the belt reinforcing layers of the Working Example were substantially the same along the tire circumferential direction. The longitudinal direction edges positioned at the center portion side of the tire width direction of the left and right strip members were set at substantially the same positions along the tire circumferential direction. As illustrated in FIG. 8, the tire width direction gaps S1 and S2 between the belt reinforcing layers of the Conventional Example varied along the tire circumferential direction. The longitudinal direction edges positioned on the center portion sides of the tire width direction of the left and right strip members were set at substantially the same positions along the tire circumferential direction.

TABLE 1

|  | Conventional Example | Working Example |
| --- | --- | --- |
| RFV | 100 | 73 |
| RRO | 100 | 71 |

It is clear from the results of Table 1 that compared to the Conventional Example, the RFV and RRO of the Working Example improved and uniformity was superior.

The invention claimed is:
1. A pneumatic tire comprising:
a belt layer embedded in an outer circumferential side of a carcass layer; and
belt reinforcing layers embedded in an outer circumferential side of the belt layer so that at least one belt reinforcing layer of the belt reinforcing layers covers each of a tire width direction left edge portion and right edge portion of the belt layer, the at least one belt reinforcing layer covering the left edge portion being separated from the at least one belt reinforcing layer covering the right edge portion in the tire width direction, both longitudinal direction edges of each of the belt reinforcing layers being aligned perpendicular to a winding direction of the belt reinforcing layers; wherein each of the belt reinforcing layers is formed by strip members constituting each of the belt reinforcing layers that are both inclined in a same direction with respect to a tire circumferential direction, and are wound in a spiral-like manner at least one time around in the tire circumferential direction;

a wide belt layer and a narrow belt layer which is narrower than the wide belt layer are embedded as the belt layer;

a tire width direction dimension of the strip members constituting each of the belt reinforcing layers is set to be larger than a protrusion part between the tire width direction edge of the narrow belt layer and the tire width direction edge of the wide belt layer, the protrusion part protruding outward in the tire width direction;

the strip members have a plurality of reinforcing cords which are parallel to the width direction of each of the belt reinforcing layers and extend in an extending direction of each of the belt reinforcing layers; and each of the belt reinforcing layers is laminated so as to protrude outward in the tire width direction from an edge in the tire width direction of the wide belt layer and the narrow belt layer on a side where each of the belt reinforcing layers is laminated, and each of the belt reinforcing layers is a single layer.

2. The pneumatic tire according to claim 1, wherein first longitudinal direction edges, of the longitudinal direction edges of the strip members constituting each of the belt reinforcing layers, positioned on a center portion side of the tire width direction are parallel with each other in the tire circumferential direction and a distance from one first longitudinal direction edge to another first longitudinal direction edge in the tire width direction remains constant along the tire circumferential direction; and second longitudinal direction edges, of the longitudinal direction edges of the strip members, positioned on an outer side of the tire width direction are parallel with each other in the tire circumferential direction and a distance from one circumferential direction edge to another circumferential direction edge, both of which extend in the tire circumferential direction of the belt reinforcing layers, in the tire width direction remains constant along the tire circumferential direction.

3. The pneumatic tire according to claim 2, wherein an embedded number of each of the belt reinforcing layers is one.

4. The pneumatic tire according to claim 1, wherein an embedded number of each of the belt reinforcing layers is one.

5. A method for manufacturing a pneumatic tire comprising:

molding a green tire having a structure constituted by belt reinforcing layers on an outer circumferential side of an annularly-formed belt layer so that at least one belt reinforcing layer of the belt reinforcing layers covers a tire width direction left edge portion and another at least one belt reinforcing layer of the belt reinforcing layers covers a tire width direction right edge portion of the annularly formed belt layer, the at least one belt reinforcing layer covering the left edge portion being separated from the another at least one belt reinforcing layer covering the right edge portion in the tire width direction, wherein both longitudinal direction edges of each of the belt reinforcing layers are aligned perpendicular to a winding direction of the belt reinforcing layers; and then in the method for manufacturing the pneumatic tire in which the green tire is vulcanized, in a step of laminating each of the belt reinforcing layers, strip members constituting each of the reinforcing layers are inclined in a same direction with respect to a tire circumferential direction, and are wound in a spiral-like manner at least one time around in the tire circumferential direction; wherein a wide belt layer and a narrow belt layer which is narrower than the wide belt layer are embedded as the belt layer;

a tire width direction dimension of the strip members constituting each of the belt reinforcing layers is set to be larger than a protrusion part between the tire width direction edge of the narrow belt layer and the tire width direction edge of the wide belt layer, the protrusion part protruding outward in the tire width direction;

the strip members have a plurality of reinforcing cords which are parallel to each other and extend in the extending direction of each of the belt reinforcing layers; and each of the belt reinforcing layers is laminated so as to protrude outward in the tire width direction from an edge in the tire width direction of the wide belt layer and the narrow belt layer on a side where each of the belt reinforcing layers is laminated, and each of the belt reinforcing layers is a single layer.

6. The method for manufacturing a pneumatic tire according to claim 5, wherein first longitudinal direction edges, of the longitudinal direction edges of the strip members constituting each of the belt reinforcing layers, positioned on a center portion side of the tire width direction are parallel with each other in the tire circumferential direction; and second longitudinal direction edges, of the longitudinal direction edges of the strip members constituting each of the belt reinforcing layers, positioned on an outer side of the tire width direction are parallel with each other in the tire circumferential direction and a distance from one circumferential direction edge of a first of the strip members to another circumferential direction edge of a second of the strip members, both of which extend in the tire circumferential direction of the belt reinforcing layers, in the tire width direction remains constant along the tire circumferential direction.

7. The method for manufacturing a pneumatic tire according to claim 6, wherein:

while rotating the annularly-formed belt layer in a first direction of the circumferential direction, a winding start point of a first of the strip members is set farther to the center portion side of the tire width direction than a winding termination point, and the first strip member is wound in a spiral-like manner at least one time around in the tire circumferential direction; and while rotating the annularly-formed belt layer in the same first direction of the circumferential direction, a winding start point of a second of the strip members is set farther to the outer side of the tire width direction than a winding termination point, and the second strip member is wound in a spiral-like manner at least one time around in the tire circumferential direction.

8. The method for manufacturing a pneumatic tire according to claim 5, wherein:

while rotating the annularly-formed belt layer in a first direction of the circumferential direction, a winding start point of a first of the strip members is set farther to a center portion side of the tire width direction than a winding termination point, and the first strip member is wound in a spiral-like manner at least one time around in the tire circumferential direction; and while rotating the annularly-formed belt layer in a direction opposite to the first direction of the circumferential direction, a winding start point of a second of the strip members is set farther to the center portion side of the tire width direction than a winding termination point, and the second strip member is wound in a spiral-like manner at least one time around in the tire circumferential direction.

9. The method for manufacturing a pneumatic tire according to claim 5, wherein:

while rotating the annularly-formed belt layer in a first direction of the circumferential direction, a winding start point of a first of the strip members is set farther to a center portion side of the tire width direction than a winding termination point, and the first strip member is wound in a spiral-like manner at least one time around in the tire circumferential direction; and while rotating the annularly-formed belt layer in the same first direction of the circumferential direction, a winding start point of a second of the strip members is set farther to the outer side of the tire width direction than a winding termination point, and the second strip member is wound in a spiral-like manner at least one time around in the tire circumferential direction.

* * * * *